(12) United States Patent
Johnson

(10) Patent No.: US 10,006,190 B1
(45) Date of Patent: Jun. 26, 2018

(54) PULLOUT FAUCET WITH MOUNTING SYSTEM

(71) Applicant: Moen Incorporated, North Olmsted, OH (US)

(72) Inventor: Michael Joseph Johnson, North Olmsted, OH (US)

(73) Assignee: Moen Incorporated, North Olmsted, OH (US)

( * ) Notice: Subject to any disclaimer, the term of this patent is extended or adjusted under 35 U.S.C. 154(b) by 0 days. days.

(21) Appl. No.: 15/368,064

(22) Filed: Dec. 2, 2016

(51) Int. Cl.
*A47K 13/10* (2006.01)
*E03C 1/04* (2006.01)
*F16K 11/00* (2006.01)

(52) U.S. Cl.
CPC .......... *E03C 1/0401* (2013.01); *E03C 1/0404* (2013.01); *E03C 1/0412* (2013.01); *F16K 19/006* (2013.01); *E03C 2001/0415* (2013.01)

(58) Field of Classification Search
CPC .... E03C 1/0401; E03C 1/0404; E03C 1/0412; E03C 2001/0415; F16K 19/006
USPC ........................................................... 4/677
See application file for complete search history.

(56) References Cited

U.S. PATENT DOCUMENTS

| | | | |
|---|---|---|---|
| 4,848,395 A | 7/1989 | Krippendorf | |
| 5,575,424 A * | 11/1996 | Fleischmann | E03C 1/04 137/218 |
| 5,845,345 A * | 12/1998 | Ko | E03C 1/04 4/678 |
| 6,070,614 A | 6/2000 | Holzheimer et al. | |
| 6,073,972 A | 6/2000 | Rivera | |
| 6,079,447 A * | 6/2000 | Holzheimer | E03C 1/0401 137/801 |
| 6,123,106 A | 9/2000 | Benstead | |
| 6,154,897 A * | 12/2000 | Paini | E03C 1/04 137/218 |
| 6,301,728 B1 | 10/2001 | Pilatowicz et al. | |
| 6,792,629 B2 | 9/2004 | Nelson et al. | |
| 6,912,742 B1 | 7/2005 | Wang | |
| 8,185,984 B2 | 5/2012 | Meehan et al. | |
| 8,240,326 B2 * | 8/2012 | Kacik | E03C 1/04 137/315.12 |
| 8,453,669 B2 | 6/2013 | Veros et al. | |
| 8,528,129 B2 | 9/2013 | Li et al. | |
| 8,584,697 B2 | 11/2013 | Hsu | |
| 9,206,917 B2 | 12/2015 | Lin | |
| 9,228,328 B2 | 1/2016 | Chen et al. | |
| 2006/0157109 A1 | 7/2006 | Vu | |
| 2010/0125946 A1 | 5/2010 | Meisner et al. | |
| 2010/0326553 A1 | 12/2010 | Kacik et al. | |

(Continued)

OTHER PUBLICATIONS

Moen Banbury Single Control Kitchen Pullout Faucet—Illustrated Parts, the Moen Banbury Single Control Kitchen Pullout Faucet and Illustrated Parts are believed to have been publicly available at least as early as Nov. 2014 (2 pages).

(Continued)

*Primary Examiner* — Huyen Le

(74) *Attorney, Agent, or Firm* — Calfee, Halter & Griswold LLP

(57) ABSTRACT

The present invention provides a pullout faucet with a mounting system that is easier to manufacture and assemble. The pullout faucet includes a cage and a mounting retainer. The mounting retainer is separately formed from the cage.

20 Claims, 10 Drawing Sheets

(56) References Cited

U.S. PATENT DOCUMENTS

2013/0042926 A1     2/2013   Jonte et al.
2015/0107019 A1     4/2015   Schmitt et al.

OTHER PUBLICATIONS

International Search Report for International App. No. PCT/US2017/064251 dated Feb. 20, 2018 (2 pages).

Written Opinion of the International Searching Authority for International App. No. PCT/US2017/064251 dated Feb. 20, 2018 (7 pages).

* cited by examiner

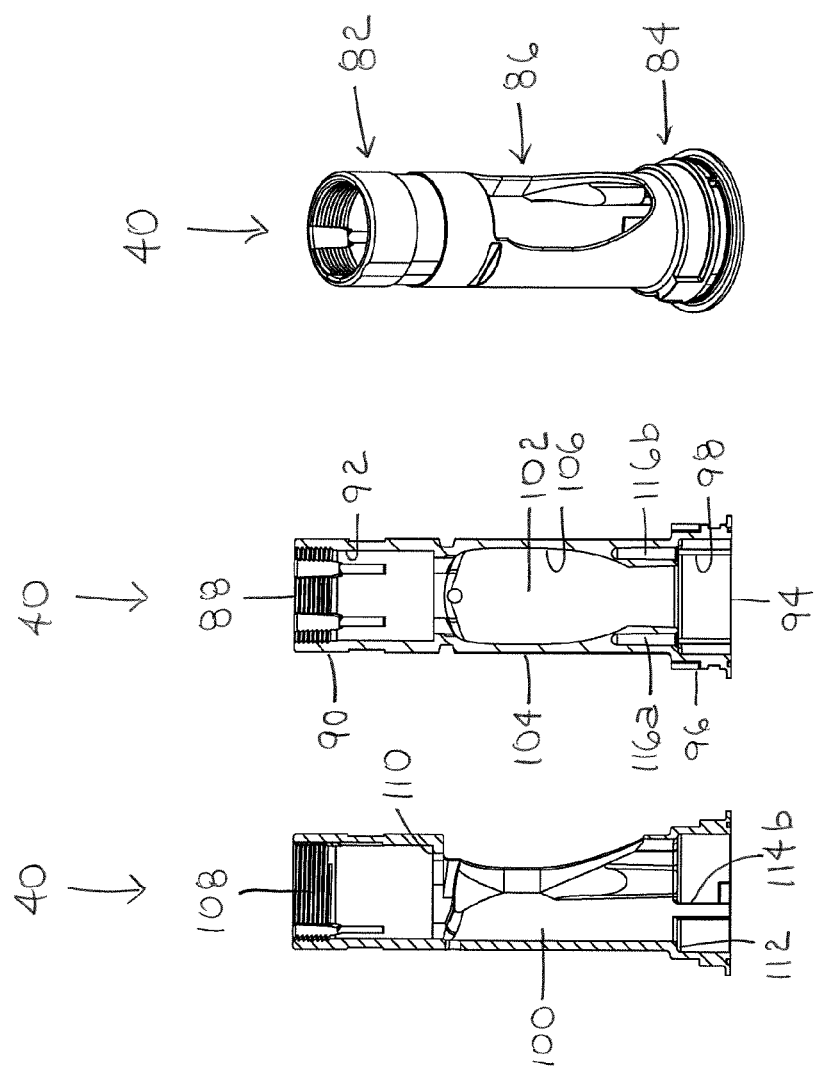

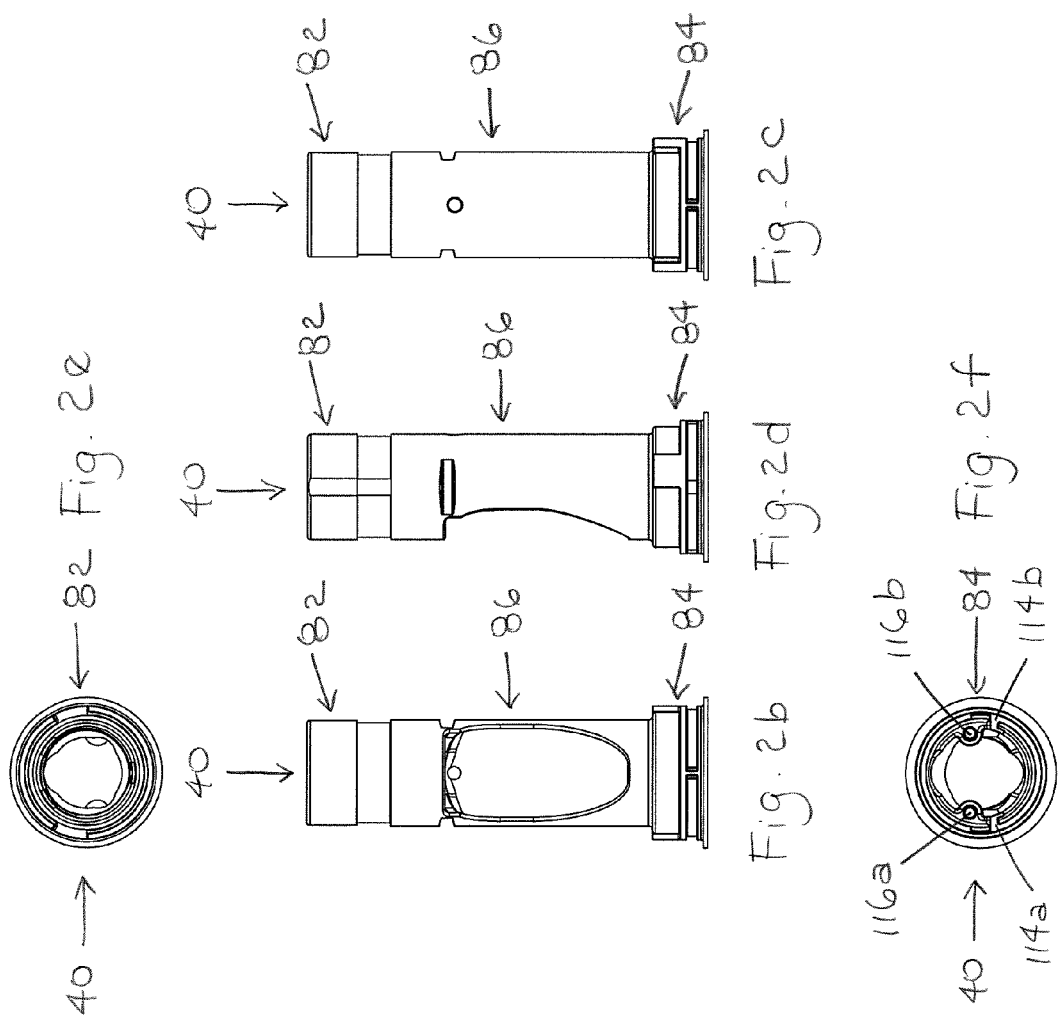

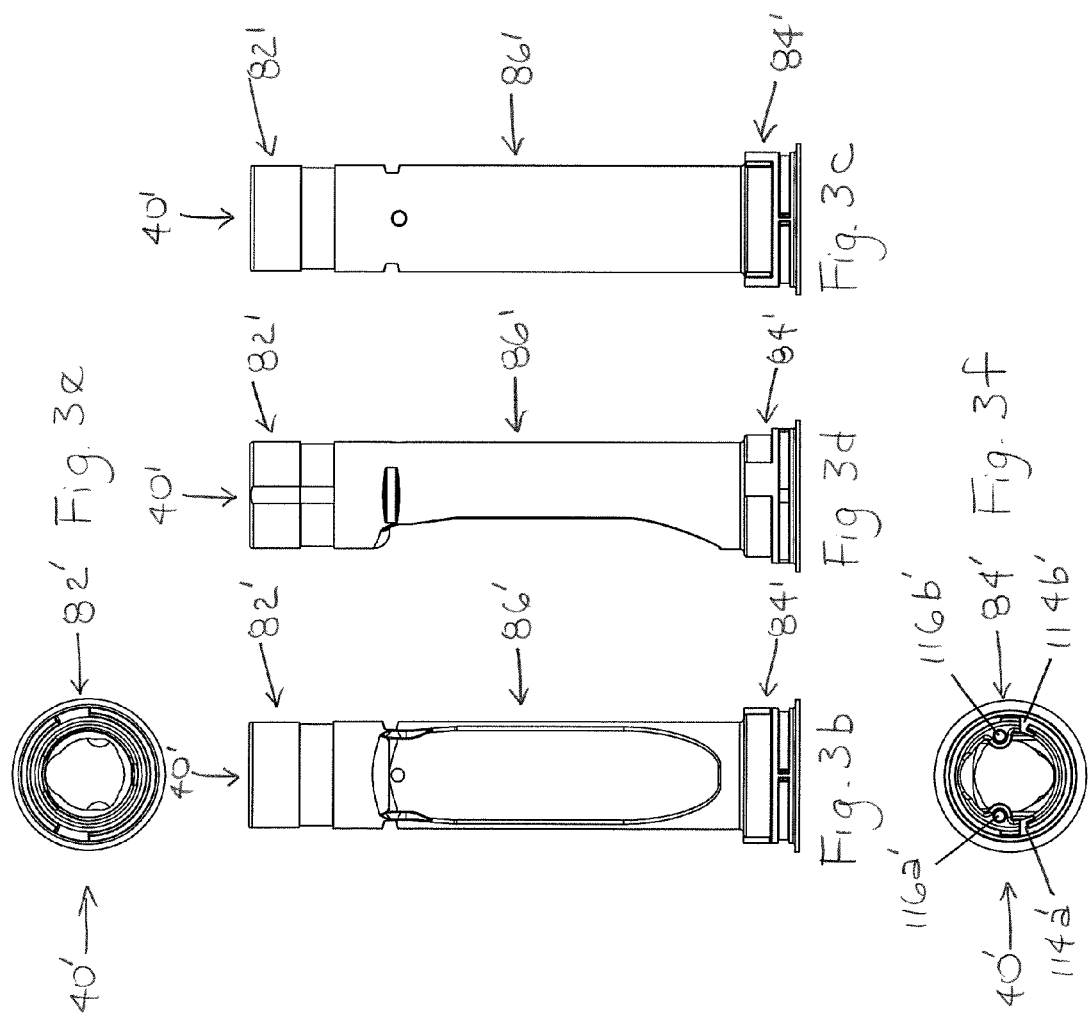

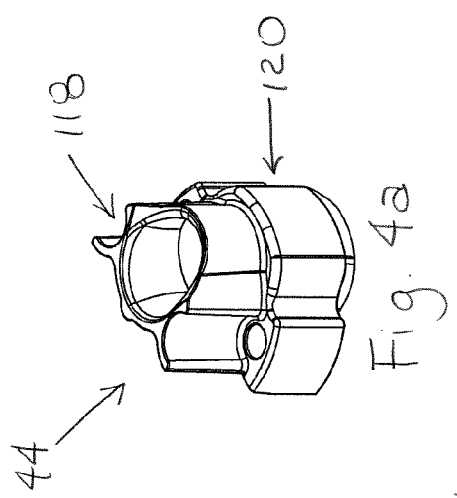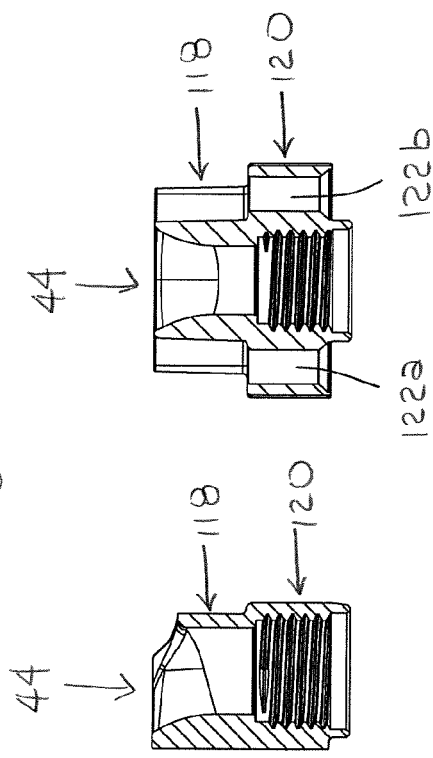

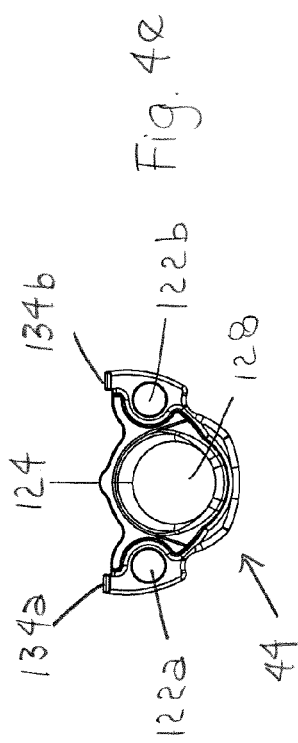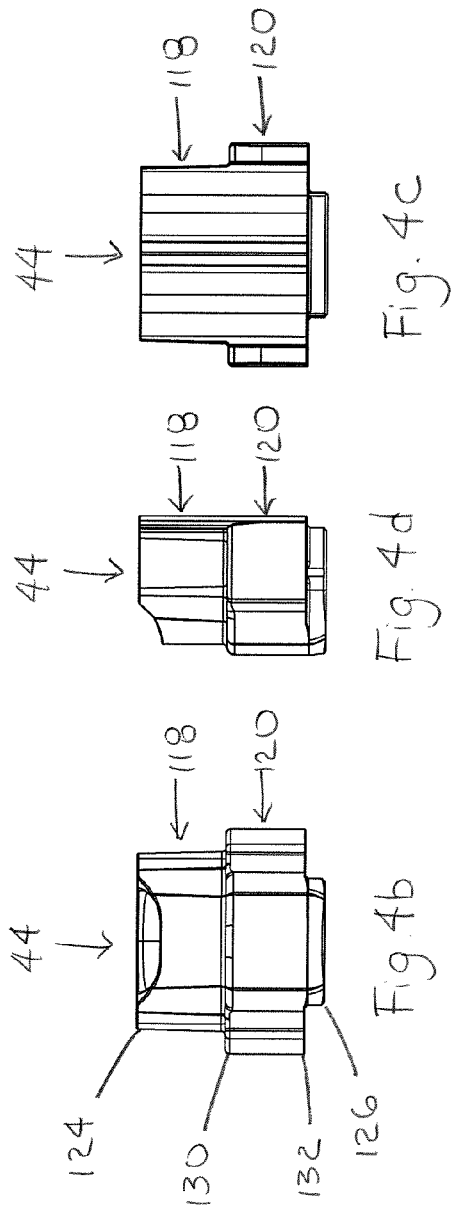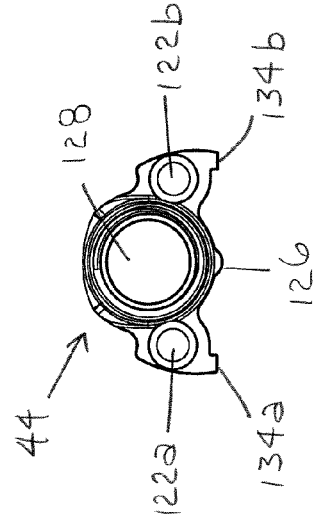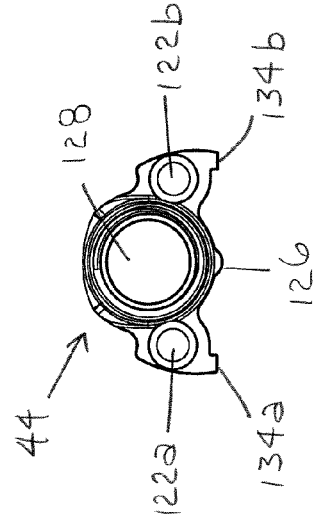

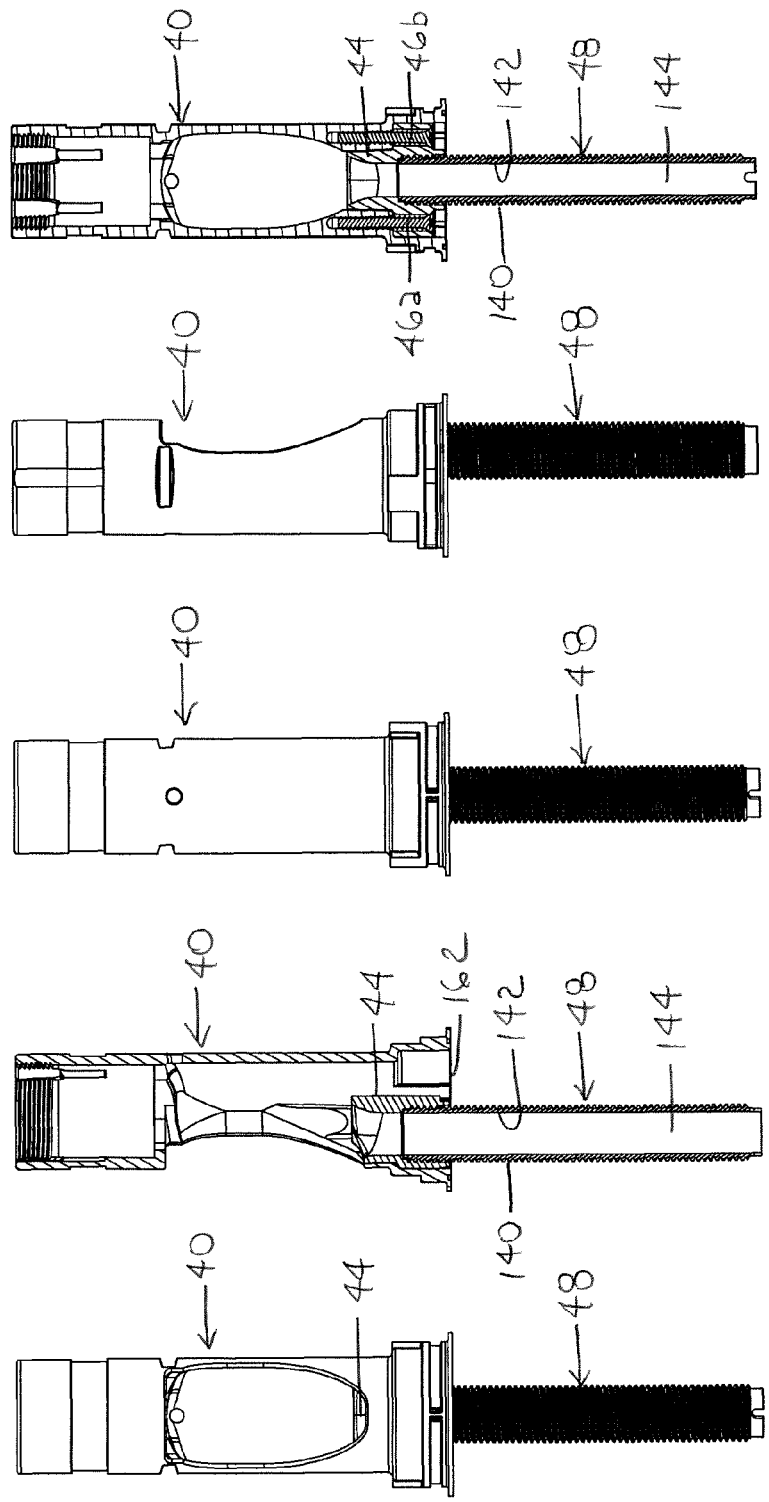

PULLOUT FAUCET WITH MOUNTING SYSTEM

FIELD

The present invention relates generally to a pullout faucet with a mounting system, and, more particularly, to a pullout faucet with a mounting system that is easier to manufacture and assemble.

BACKGROUND

Pullout faucets can be difficult to manufacture and assemble. Prior mounting systems for pullout faucets limit manufacturing options and cause difficulties during assembly.

SUMMARY

The present invention provides a pullout faucet with a mounting system that that is easier to manufacture and assemble.

In an exemplary embodiment, the mounting system includes a cage and a mounting retainer. The cage includes a first end section, a second end section, and an intermediate section. The first end section includes a first opening, a first outer surface, and a first inner surface. The first opening is operable to receive at least a portion of a cartridge assembly. The second end section includes a second opening, a second outer surface, and a second inner surface. The second opening is operable to receive supply hoses and an outlet hose. The cage includes a cavity extending between the first opening and the second opening. The intermediate section extends between the first end section and the second end section. The intermediate section includes a third opening, a third outer surface, and a third inner surface. The third opening is operable to receive a pullout hose. The second inner surface includes a mounting retainer ledge extending around at least a portion of the second inner surface. The mounting retainer is separately formed from the cage. The mounting retainer is operable to be inserted into the second opening in the second end section of the cage. The mounting retainer includes a body and a rib. The body includes a first end and a second end. The body includes an opening extending through the body from the first end to the second end. The opening in the body is operable to receive a mounting shank and the pullout hose. The rib includes a first side and a second side. The rib extends around a portion of the body between the first end and the second end. When the mounting retainer is secured in the second opening in the second end section of the cage, the first side of the rib of the mounting retainer abuts the mounting retainer ledge on the second inner surface of the second end section of the cage and prevents the mounting retainer from moving further toward the first end section of the cage.

In an exemplary embodiment, the mounting system includes a cage and a mounting retainer. The cage includes a first end section, a second end section, and an intermediate section. The first end section includes a first opening, a first outer surface, and a first inner surface. The first opening is operable to receive at least a portion of a cartridge assembly. The second end section includes a second opening, a second outer surface, and a second inner surface. The second opening is operable to receive supply hoses and an outlet hose. The cage includes a cavity extending between the first opening and the second opening. The intermediate section extends between the first end section and the second end section. The intermediate section includes a third opening, a third outer surface, and a third inner surface. The third opening is operable to receive a pullout hose. The second inner surface includes a mounting retainer ledge extending around at least a portion of the second inner surface. The second inner surface includes at least one projection extending outwardly from the second inner surface into the second opening. The mounting retainer is separately formed from the cage. The mounting retainer is operable to be inserted into the second opening in the second end section of the cage. The mounting retainer includes a body and a rib. The body includes a first end and a second end. The body includes an opening extending through the body from the first end to the second end. The opening in the body is operable to receive a mounting shank and the pullout hose. The rib includes a first side and a second side. The rib extends around a portion of the body between the first end and the second end. The rib includes at least one edge on an end of the rib. When the mounting retainer is secured in the second opening in the second end section of the cage, the first side of the rib of the mounting retainer abuts the mounting retainer ledge on the second inner surface of the second end section of the cage and prevents the mounting retainer from moving further toward the first end section of the cage. When the mounting retainer is secured in the second opening in the second end section of the cage, the edge of the rib of the mounting retainer abuts the projection on the second inner surface of the second end section of the cage and prevents the mounting retainer from rotating in the cage.

In an exemplary embodiment, the pullout faucet includes a housing, a wand, a handle, a cartridge assembly, a cage, and a mounting retainer. The housing includes a hub and a receptor. The wand includes a waterway and an outlet for delivering water from the faucet. The handle is operable to control temperature and flow of water being delivered from the faucet. The cartridge assembly is operable to be connected to the handle. The cartridge assembly is operable to control temperature and flow of water being delivered from the faucet based on movement of the handle. The cage is operable to be received in the hub of the housing. The cage includes a first end section, a second end section, and an intermediate section. The first end section includes a first opening, a first outer surface, and a first inner surface. The first opening is operable to receive at least a portion of a cartridge assembly. The second end section includes a second opening, a second outer surface, and a second inner surface. The second opening is operable to receive supply hoses and an outlet hose. The cage includes a cavity extending between the first opening and the second opening. The intermediate section extends between the first end section and the second end section. The intermediate section includes a third opening, a third outer surface, and a third inner surface. The third opening is operable to receive a pullout hose. The second inner surface includes a mounting retainer ledge extending around at least a portion of the second inner surface. The mounting retainer is separately formed from the cage. The mounting retainer is operable to be inserted into the second opening in the second end section of the cage. The mounting retainer includes a body and a rib. The body includes a first end and a second end. The body includes an opening extending through the body from the first end to the second end. The opening in the body is operable to receive a mounting shank and the pullout hose. The rib includes a first side and a second side. The rib extends around a portion of the body between the first end and the second end. When the mounting retainer is secured in the second opening in the second end section of the cage, the first side of the rib of the mounting retainer abuts the mounting retainer ledge on the second inner surface of the second end section of the cage and prevents the mounting retainer from moving further toward the first end section of the cage.

BRIEF DESCRIPTION OF THE DRAWINGS

—FIG. 1a is an exploded perspective view, and FIG. 1b is a right side cross-sectional view;

FIGS. 2a-2h are views of the cage of FIG. 1a-FIG. 2a is a perspective view, FIG. 2b is a front elevational view, FIG. 2c is a rear elevational view, FIG. 2d is a right side elevational view, FIG. 2e is a top plan view, FIG. 2f is a bottom plan view, FIG. 2g is a front cross-sectional view, and FIG. 2h is a left side cross-sectional view;

FIGS. 3a-3g are views of another exemplary embodiment of the cage of FIG. 1a-FIG. 3a is a perspective view, FIG. 3b is a front elevational view, FIG. 3c is a rear elevational view, FIG. 3d is a right side elevational view, FIG. 3e is a top plan view, FIG. 3f is a bottom plan view, and FIG. 3g is a left side cross-sectional view;

FIGS. 4a-4h are views of the mounting retainer of FIG. 1a-FIG. 4a is a perspective view, FIG. 4b is a front elevational view, FIG. 4c is a rear elevational view, FIG. 4d is a right side elevational view, FIG. 4e is a top plan view, FIG. 4f is a bottom plan view, FIG. 4g is a front cross-sectional view, and FIG. 4h is a left side cross-sectional view; and FIGS. 5a-5g are views of the mounting system of FIG. 1a-FIG. 5a is a perspective view, FIG. 5b is an exploded perspective view, FIG. 5c is a front elevational view, FIG. 5d is a rear elevational view, FIG. 5e is a left side elevational view, FIG. 5f is a front cross-sectional view, and FIG. 5g is a right side cross-sectional view;

where all cross-sectional views are taken in the specified direction through a central longitudinal axis of the pullout faucet.

DETAILED DESCRIPTION

The present invention provides a pullout faucet with a mounting system that is easier to manufacture and assemble.

Figure 1A:
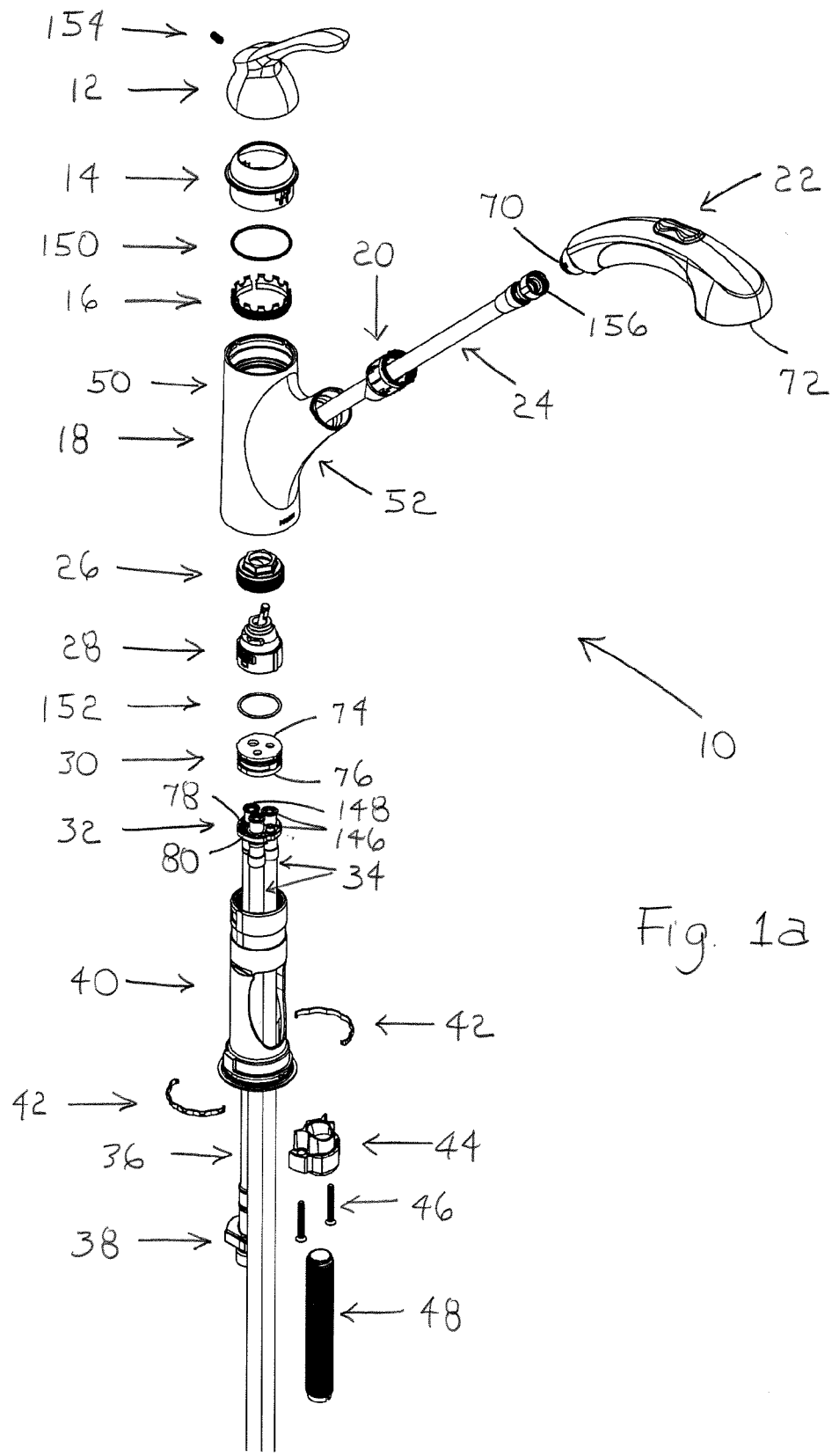
FIGS. 1a-1b are views of a pullout faucet with a mounting system according to an exemplary embodiment of the present invention, including a cage and a mounting retainer
Figure 1B:
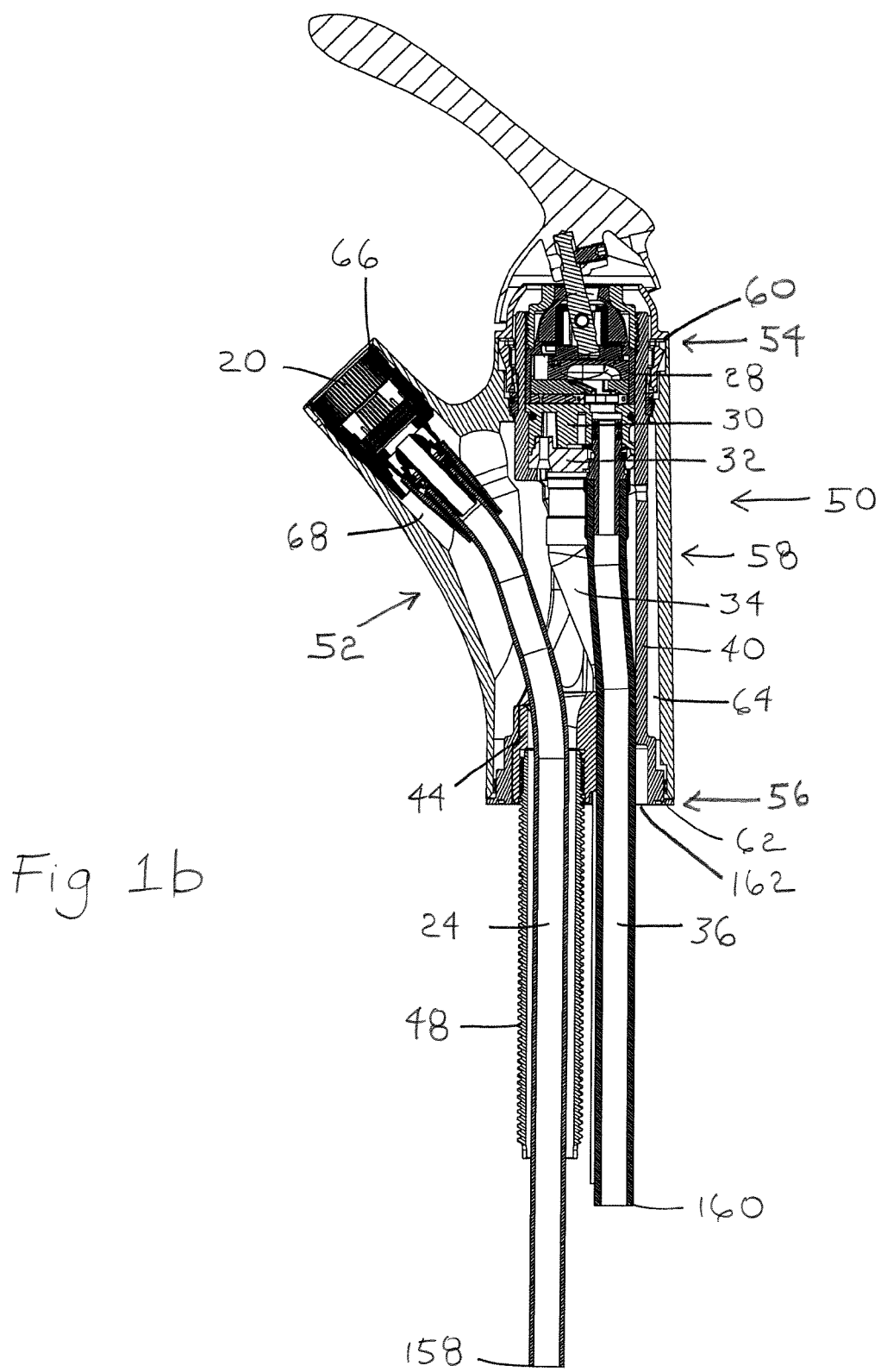
Figure 3A:
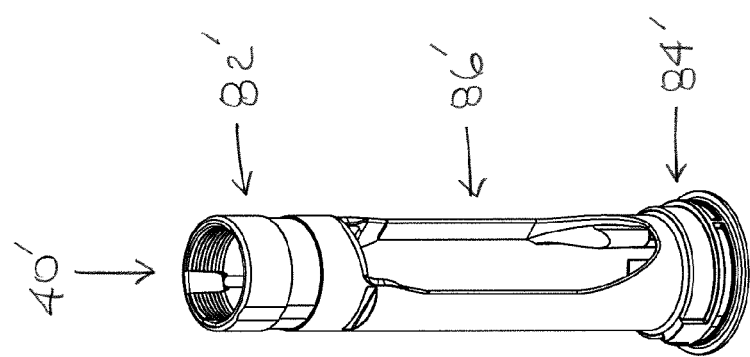
Figure 3G:
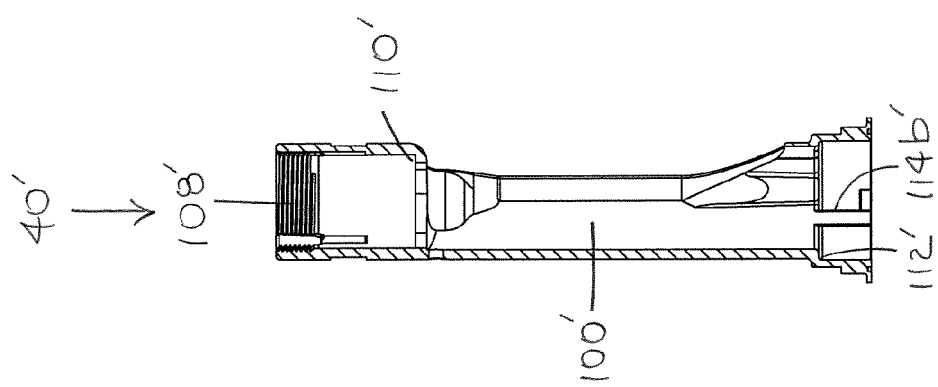

An exemplary embodiment of a pullout faucet 10 including a mounting system is shown in FIGS. 1a and 1b. As illustrated, the faucet 10 includes a handle 12, a dome 14, an upper bearing 16, a housing 18, a docking collar 20, a wand 22, and a pullout hose 24. Additionally, as illustrated, the faucet 10 includes a cartridge nut 26, a cartridge assembly 28, a cartridge seat 30, a hose retainer 32, hot and cold water supply hoses 34, an outlet hose 36, and an outlet hose connector 38. Further, as illustrated, the faucet 10 includes a cage 40, lower bearings 42, a mounting retainer 44, fasteners 46, and a mounting shank 48. Pullout faucets are well-known in the art and, therefore, only the relevant components of the pullout faucet 10 will be described in greater detail.

The housing 18 is operable to rotate relative to the cage 40. The housing 18 includes a hub 50 and a receptor 52. In the illustrated embodiment, the hub 50 is generally cylindrical shaped. The hub 50 includes a top or first end section 54, a bottom or second end section 56, and an intermediate section 58. The first end section 54 of the hub 50 includes a first opening 60. The second end section 56 of the hub 50 includes a second opening 62. The hub 50 includes a cavity 64 extending between the first opening 60 in the first end section 54 of the hub 50 and the second opening 62 in the second end section 56 of the hub 50. The intermediate section 58 of the hub 50 extends between the first end section 54 of the hub 50 and the second end section 56 of the hub 50. The receptor 52 extends outwardly from the intermediate section 58 of the hub 50. The receptor 52 includes a wand opening 66. The receptor 52 includes a passageway 68 extending between the wand opening 66 and the cavity 64 of the hub 50.

The wand 22 includes a waterway 70 and an outlet 72 for delivering water from the faucet 10. The handle 12 is used to control the temperature and flow of water being delivered from the faucet 10. The dome 14 provides an interface between the handle 12 and the first end section 54 of the hub 50 of the housing 18. The pullout hose 24 enables the wand 22 to be pulled away from and returned to the wand opening 66 in the receptor 52 of the housing 18.

The cartridge assembly 28 is connected to the handle 12. The cartridge assembly 28 controls the temperature and flow of the water being delivered from the faucet 10 based on movement of the handle 12 by a user. In the illustrated embodiment, the cartridge assembly 28 is a ceramic disk cartridge assembly. However, one of ordinary skill in the art will appreciate that other cartridge assemblies could be used in the faucet 10. The cartridge seat 30 and the hose retainer 32 provide an interface between the cartridge assembly 28 and the supply hoses 34 and the outlet hose 36. In the illustrated embodiment, the cartridge seat 30 is generally disk shaped. The cartridge seat 30 includes a top or first side 74 and a bottom or second side 76. In the illustrated embodiment, the hose retainer 32 is generally disk shaped. The hose retainer 32 includes a top or first side 78 and a bottom or second side 80.

The cage 40 provides mounting structure for the pullout faucet 10. An exemplary embodiment of the cage 40 is shown in FIGS. 2a-2h and 5a-5g. Another exemplary embodiment of the cage 40' is shown in FIGS. 3a-3g. The difference between the cage 40 and the cage 40' is that the cage 40' has a longer intermediate section 86' and, thus, is taller. Throughout the description, the reference numbers for the cage 40 will be used for ease of reference with the understanding that the description applies equally to the cage 40' and that each component of the cage 40' will use the same reference number as the corresponding component of the cage 40 with the addition of a symbol. In an exemplary embodiment, the cage 40 is integrally formed. In an exemplary embodiment, the cage 40 is made from an injection molded thermoplastic. In the illustrated embodiment, the cage 40 is generally cylindrical shaped. The cage 40 includes a top or first end section 82, a bottom or second end section 84, and an intermediate section 86. The first end section 82 of the cage 40 includes a first opening 88, a first outer surface 90, and a first inner surface 92. In the illustrated embodiment, the first opening 88 in the first end section 82 of the cage 40 is operable to receive the hose retainer 32, the cartridge seat 30, at least a portion of the cartridge assembly 28, and at least a portion of the cartridge nut 26. The second end section 84 of the cage 40 includes a second opening 94, a second outer surface 96, and a second inner surface 98. In the illustrated embodiment, the second opening 94 in the second end section 84 of the cage 40 is operable to receive the mounting retainer 44, the supply hoses 34, and the outlet hose 36. The cage 40 includes a cavity 100 extending between the first opening 88 in the first end section 82 of the cage 40 and the second opening 94 in the second end section 84 of the cage 40. The intermediate section 86 of the cage 40 extends between the first end section 82 of the cage 40 and the second end section 84 of the cage 40. The intermediate section 86 of the cage 40 includes a third opening 102, a third outer surface 104, and a third inner surface 106. The third opening 102 in the cage 40 is operable to receive the pullout hose 24.

In an exemplary embodiment, the first inner surface 92 of the first end section 82 of the cage 40 includes threads 108 extending around at least a portion of the first inner surface 92. Additionally, in an exemplary embodiment, the first inner surface 92 of the first end section 82 of the cage 40 includes a cartridge ledge 110 extending around at least a portion of the first inner surface 92. In an exemplary embodiment, the second inner surface 98 of the second end section 84 of the cage 40 includes a mounting retainer ledge 112 extending around at least a portion of the second inner surface 98. In an exemplary embodiment, the second inner surface 98 of the second end section 84 of the cage 40 includes at least one projection 114 extending outwardly from the second inner surface 98 into the second opening 94 in the second end section 84 of the cage 40. In the illustrated embodiment, the second inner surface 98 of the second end section 84 of the cage 40 includes a first projection 114a and a second projection 114b extending outwardly from the second inner surface 98 into the second opening 94 in the second end section 84 of the cage 40. In an exemplary embodiment, the second inner surface 98 of the second end section 84 of the cage 40 includes at least one fastener opening 116. In the illustrated embodiment, the second inner surface 98 of the second end section 84 of the cage 40 includes two fastener openings 116a, 116b.

The mounting retainer 44 provides mounting structure for the pullout faucet 10. An exemplary embodiment of the mounting retainer 44 is shown in FIGS. 4a-4h, 5a-5c, and 5f-5g. In an exemplary embodiment, the mounting retainer 44 is integrally formed. The mounting retainer 44 is separately formed from the cage 40. In an exemplary embodiment, the mounting retainer 44 is made from an injection molded thermoplastic. In an exemplary embodiment, the mounting retainer 44 includes a body 118 and a rib 120. In an exemplary embodiment, the mounting retainer 44 includes at least one fastener opening 122. In the illustrated embodiment, the mounting retainer 44 includes two fastener openings 122a, 122b. The body 118 includes a top or first end 124 and a bottom or second end 126. The body 118 includes an opening 128 extending through the body 118 from the first end 124 to the second end 126. In an exemplary embodiment, at least a portion of the opening 128 in the body 118 of the mounting retainer 44 is threaded. The rib 120 includes a top or first side 130 and a bottom or second side 132. The rib 120 extends around a portion of the body 118 between the first end 124 of the body 118 and the second end 126 of the body 118. In the illustrated embodiment, the rib 120 has a generally semi-circular cross-sectional shape. In an exemplary embodiment, the rib 120 includes at least one edge 134 on an end of the rib 120. In the illustrated embodiment, the rib 120 includes a first edge 134a and a second edge 134b on opposing ends of the rib 120.

The mounting shank 48 provides mounting structure for the pullout faucet 10. An exemplary embodiment of the mounting shank 48 is shown in FIGS. 5a-5g. In an exemplary embodiment, the mounting shank 48 is made from a metal. In the illustrated embodiment, the mounting shank 48 is generally cylindrical shaped. The mounting shank 48 includes a top or first end 136 and a bottom or second end 138. The mounting shank 48 includes an outer surface 140 and an inner surface 142. In an exemplary embodiment, at least a portion of the outer surface 140 of the mounting shank 48 is threaded. The mounting shank 48 includes an opening 144 extending through the mounting shank 48 from the first end 136 to the second end 138.

Figure 5A:
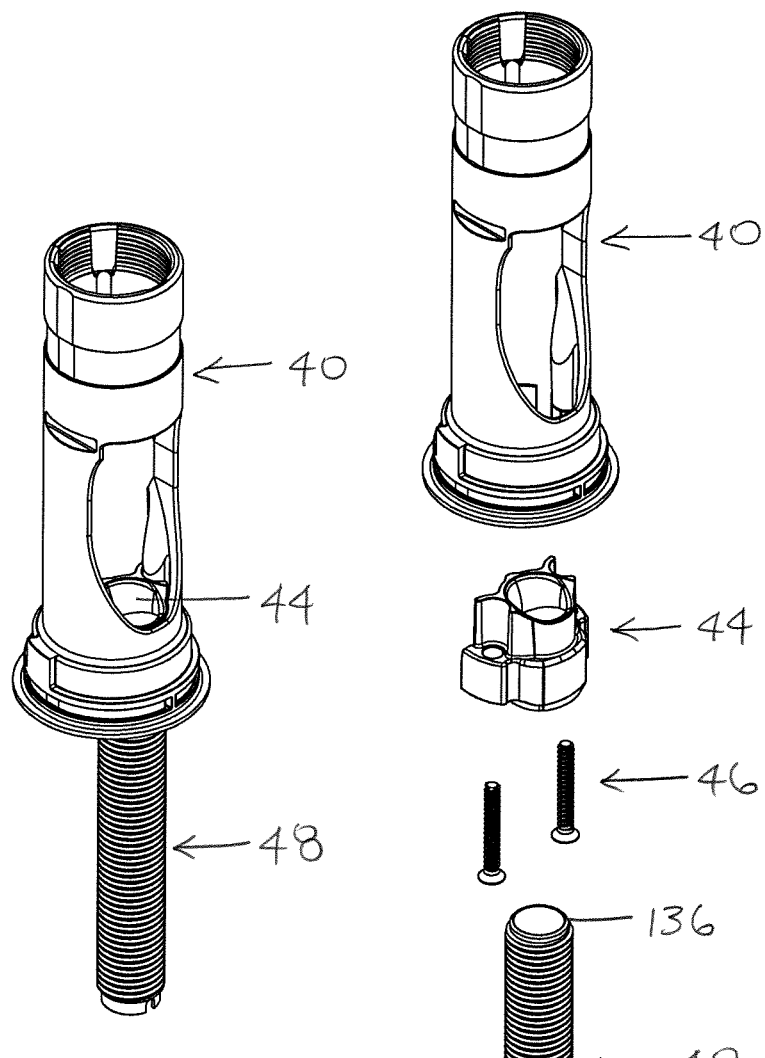
Figure 5B:
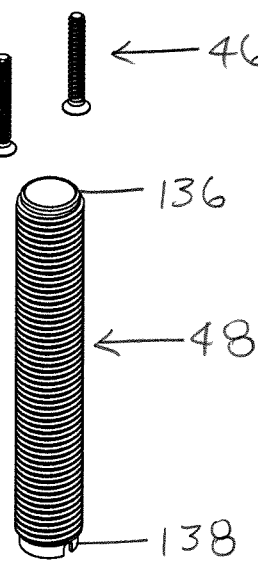

The fasteners 46 provide mounting structure for the pullout faucet 10. An exemplary embodiment of the fasteners 46 is shown in FIGS. 5b and 5f. In an exemplary embodiment, there is at least one fastener 46. In the illustrated embodiment, there are two fasteners 46a, 46b. However, one of ordinary skill in the art will appreciate that more or less fasteners 46 could be used. In the illustrated embodiment, the fasteners 46 are screws. However, one of ordinary skill in the art will appreciate that other fasteners could be used, such as adhesives. Additionally, one of ordinary skill in the art will appreciate that other fastening methods that do not require separate fasteners could be used, such as welding or heat staking.

The assembly of the illustrated pullout faucet 10 with the mounting system will now be described. A first end 146 of the supply hoses 34 and a first end 148 of the outlet hose 36 are inserted through the cage 40 from the second opening 94 in the second end section 84 of the cage 40 to the first opening 88 in the first end section 82 of the cage 40. The first end 146 of the supply hoses 34 and the first end 148 of the outlet hose 36 are inserted into and through the hose retainer 32 from the second side 80 to the first side 78. The supply hoses 34 and the outlet hose 36 are pulled down through the cage 40 until the second side 80 of the hose retainer 32 abuts the cartridge ledge 110 on the first inner surface 92 of the first end section 82 of the cage 40. An O-ring 152 is placed on the cartridge seat 30. The cartridge seat 30 is inserted into the first opening 88 in the first end section 82 of the cage 40 until the second side 76 of the cartridge seat 30 abuts the first side 78 of the hose retainer 32 and the first end 146 of the supply hoses 34 and the first end 148 of the outlet hose 36 are seated inside the cartridge seat 30. The cartridge assembly 28 is inserted into the first opening 88 in the first end section 82 of the cage 40 until the cartridge assembly 28 abuts the first side 74 of the cartridge seat 30. The cartridge nut 26 is threaded into the threads 108 on the first inner surface 92 of the first end section 82 of the cage 40.

The first end 124 of the body 118 of the mounting retainer 44 is inserted into the second opening 94 in the second end section 84 of the cage 40 until the first side 130 of the rib 120 of the mounting retainer 44 abuts the mounting retainer ledge 112 on the second inner surface 98 of the second end section 84 of the cage 40, the first edge 134a of the rib 120 of the mounting retainer 44 abuts the first projection 114a on the second inner surface 98 of the second end section 84 of the cage 40, and the second edge 134b of the rib 120 of the mounting retainer 44 abuts the second projection 114b on the second inner surface 98 of the second end section 84 of the cage 40. The fasteners 46 are inserted through the fastener openings 122 in the mounting retainer 44 and threaded into the fastener openings 116 in the second inner surface 98 of the second end section 84 of the cage 40. The first end 136 of the mounting shank 48 is threaded into the opening 128 in the body 118 of the mounting retainer 44. The lower bearings 42 are placed on the second outer surface 96 of the second end section 84 of the cage 40.

The docking collar 20 is inserted into the wand opening 66 in the receptor 52 of the housing 18. The second end section 56 of the hub 50 of the housing 18 is placed over the first end section 82 of the cage 40. The hub 50 of the housing 18 is pushed down over the cage 40 until the cage 40 is received within the cavity 64 in the hub 50 of the housing 18.

In this position, the wand opening 66 and the passageway 68 in the receptor 52 of the housing 18 align with the third opening 102 in the intermediate section 86 of the cage 40. An O-ring 150 is placed on the upper bearing 16. The upper bearing 16 is placed over the cartridge nut 26. The dome 14 is placed over the upper bearing 16. The handle 12 is placed over the dome 14. A set screw 154 is threaded through an opening in the handle 12 into the cartridge assembly 28. A first end 156 of the pullout hose 24 is connected to the wand 22. A second end 158 of the pullout hose 24 is inserted through the wand opening 66 and the passageway 68 in the receptor 52 of the housing 18, through the third opening 102 in the intermediate section 86 of the cage 40, through the opening 128 in the body 118 of the mounting retainer 44, and through the mounting shank 48. The second end 158 of the pullout hose 24 is connected to a second end 160 of the outlet hose 36 via the outlet hose connector 38.

While the assembly steps having been described above in a particular order, one of ordinary skill in the art will appreciate that these steps do not need to be performed in this order.

Once assembled, the supply hoses 34 and the outlet hose 36 are separated from the pullout hose 24. More specifically, the supply hoses 34 and the outlet hose 36 extend through an opening 162 between the mounting retainer 44 and the second inner surface 98 of the second end section 84 of the cage 40, whereas the pullout hose 24 extends through the opening 144 in the mounting shank 48 and the opening 128 in the body 118 of the mounting retainer 44. As a result, when the wand 22 is pulled away from and returned to the wand opening 66 in the receptor 52 of the housing 18, the pullout hose 24 does not contact the supply hoses 34 and the outlet hose 36.

Additionally, in the illustrated embodiment, once the mounting retainer 44 is inserted into the second opening 94 in the second end section 84 of the cage 40, a geometric mating and an interference fit are created between the mounting retainer 44 and the cage 40. In the illustrated embodiment, the geometric mating is created from corresponding geometry of the mounting retainer 44 and the cage 40. More specifically, in the illustrated embodiment, the geometric mating is created from the corresponding shape of the rib 120 of the mounting retainer 44 and the second inner surface 98 of the second end section 84 of the cage 40, and the abutment of the first edge 134*a* and the second edge 134*b* of the rib 120 of the mounting retainer 44 with the first projection 114*a* and the second projection 114*b* on the second inner surface 98 of the second end section 84 of the cage 40. The geometric mating and the interference fit between the mounting retainer 44 and the cage 40 constrain movement and rotation between the mounting retainer 44 and the cage 40. More specifically, the mounting retainer 44 can only move in a downward direction and cannot move or rotate in any other direction once it is inserted into the cage 40. One of ordinary skill in the art will appreciate that either or both of the geometric mating and the interference fit could constrain movement and rotation between the mounting retainer 44 and the cage 40. In the illustrated embodiment, once the mounting retainer 44 is attached to the cage 40 via the fasteners 46 (or another fastener or fastening method), the mounting retainer 44 is also constrained from moving in a downward direction.

Further, having a separate cage 40 and mounting retainer 44 improves the manufacturability of the cage 40, as well as enables easier assembly of the pullout faucet 10 because the mounting retainer 44 can be inserted into and attached to the cage 40 after the supply hoses 34 and the outlet hose 36 have been inserted into the cage 40 and properly connected.

One of ordinary skill in the art will now appreciate that the present invention provides a pullout faucet with a mounting system that is easier to manufacture and assemble. Although the present invention has been shown and described with reference to particular embodiments, equivalent alterations and modifications will occur to those skill in the art upon reading and understanding this specification. The present invention includes all such equivalent alterations and modifications and is limited only by the scope of the following claims in light of their full scope of equivalents.

What is claimed is:

1. A mounting system for a pullout faucet, comprising:
a cage, the cage including a first end section, a second end section, and an intermediate section, the first end section including a first opening, a first outer surface, and a first inner surface, the first opening operable to receive at least a portion of a cartridge assembly, the second end section including a second opening, a second outer surface, and a second inner surface, the second opening operable to receive supply hoses and an outlet hose, the cage including a cavity extending between the first opening and the second opening, the intermediate section extending between the first end section and the second end section, the intermediate section including a third opening, a third outer surface, and a third inner surface, the third opening operable to receive a pullout hose, the second inner surface including a mounting retainer ledge extending around at least a portion of the second inner surface; and
a mounting retainer, the mounting retainer being separately formed from the cage, the mounting retainer operable to be inserted into the second opening in the second end section of the cage, the mounting retainer including a body and a rib, the body including a first end and a second end, the body including an opening extending through the body from the first end to the second end, the opening in the body operable to receive a mounting shank and the pullout hose, the rib including a first side and a second side, the rib extending around a portion of the body between the first end and the second end;
wherein, when the mounting retainer is secured in the second opening in the second end section of the cage, the first side of the rib of the mounting retainer abuts the mounting retainer ledge on the second inner surface of the second end section of the cage and prevents the mounting retainer from moving further toward the first end section of the cage.

2. The mounting system for a pullout faucet of claim 1, wherein, when the mounting retainer is inserted into the second opening in the second end section of the cage, a geometric mating is created between the mounting retainer and the cage.

3. The mounting system for a pullout faucet of claim 1, wherein, when the mounting retainer is inserted into the second opening in the second end section of the cage, an interference fit is created between the mounting retainer and the cage.

4. The mounting system for a pullout faucet of claim 1, wherein, when the mounting retainer is secured in the second opening in the second end section of the cage, the supply hoses and the outlet hose extend through an opening between the mounting retainer and the second inner surface of the second end section of the cage, and the pullout hose extends through the opening in the mounting shank and the opening in the body of the mounting retainer.

5. The mounting system for a pullout faucet of claim 1, wherein:
the second inner surface of the second end section of the cage includes a first projection and a second projection extending outwardly from the second inner surface into the second opening in the second end section of the cage;
the rib of the mounting retainer includes a first edge and a second edge on opposing ends of the rib; and
when the mounting retainer is secured in the second opening in the second end section of the cage, the first edge of the rib of the mounting retainer abuts the first projection on the second inner surface of the second end section of the cage, and the second edge of the rib of the mounting retainer abuts the second projection on the second inner surface of the second end section of the cage, and prevents the mounting retainer from rotating in the cage.

6. The mounting system for a pullout faucet of claim 1, wherein the rib has a generally semi-circular cross-sectional shape.

7. The mounting system for a pullout faucet of claim 1, wherein:
the second inner surface of the second end section of the cage includes fastener openings;
the mounting retainer includes fastener openings; and
the mounting retainer is secured in the second opening in the second end section of the cage via fasteners that extend through the fastener openings in the mounting retainer and the fastener openings in the second inner surface of the second end section of the cage.

8. The mounting system for a pullout faucet of claim 1, further including:
a hose retainer, the hose retainer operable to be received in the first opening in the first end section of the cage, the hose retainer including a first side and a second side; and
a cartridge seat, the cartridge seat operable to be received in the first opening in the first end section of the cage; wherein:
the first inner surface of the first end section of the cage includes a cartridge ledge extending around at least a portion of the first inner surface; and
when the hose retainer, the cartridge seat, and the cartridge assembly are secured in the first opening in the first end section of the cage, the second side of the hose retainer abuts the cartridge ledge on the first inner surface of the first end section of the cage and prevents the hose retainer from moving further toward the second end section of the cage.

9. The mounting system for a pullout faucet of claim 1, wherein the cage is integrally formed.

10. The mounting system for a pullout faucet of claim 1, wherein the mounting retainer is integrally formed.

11. A mounting system for a pullout faucet, comprising:
a cage, the cage including a first end section, a second end section, and an intermediate section, the first end section including a first opening, a first outer surface, and a first inner surface, the first opening operable to receive at least a portion of a cartridge assembly, the second end section including a second opening, a second outer surface, and a second inner surface, the second opening operable to receive supply hoses and an outlet hose, the cage including a cavity extending between the first opening and the second opening, the intermediate section extending between the first end section and the second end section, the intermediate section including a third opening, a third outer surface, and a third inner surface, the third opening operable to receive a pullout hose, the second inner surface including a mounting retainer ledge extending around at least a portion of the second inner surface, the second inner surface including at least one projection extending outwardly from the second inner surface into the second opening; and
a mounting retainer, the mounting retainer being separately formed from the cage, the mounting retainer operable to be inserted into the second opening in the second end section of the cage, the mounting retainer including a body and a rib, the body including a first end and a second end, the body including an opening extending through the body from the first end to the second end, the opening in the body operable to receive a mounting shank and the pullout hose, the rib including a first side and a second side, the rib extending around a portion of the body between the first end and the second end, the rib including at least one edge on an end of the rib;
wherein, when the mounting retainer is secured in the second opening in the second end section of the cage, the first side of the rib of the mounting retainer abuts the mounting retainer ledge on the second inner surface of the second end section of the cage and prevents the mounting retainer from moving further toward the first end section of the cage; and
wherein, when the mounting retainer is secured in the second opening in the second end section of the cage, the edge of the rib of the mounting retainer abuts the projection on the second inner surface of the second end section of the cage, and prevents the mounting retainer from rotating in the cage.

12. The mounting system for a pullout faucet of claim 11, wherein, when the mounting retainer is inserted into the second opening in the second end section of the cage, a geometric mating is created between the mounting retainer and the cage.

13. The mounting system for a pullout faucet of claim 11, wherein, when the mounting retainer is inserted into the second opening in the second end section of the cage, an interference fit is created between the mounting retainer and the cage.

14. The mounting system for a pullout faucet of claim 11, wherein, when the mounting retainer is secured in the second opening in the second end section of the cage, the supply hoses and the outlet hose extend through an opening between the mounting retainer and the second inner surface of the second end section of the cage, and the pullout hose extends through the opening in the mounting shank and the opening in the body of the mounting retainer.

15. The mounting system for a pullout faucet of claim 11, wherein:
the second inner surface of the second end section of the cage includes a first projection and a second projection extending outwardly from the second inner surface into the second opening in the second end section of the cage;
the rib of the mounting retainer includes a first edge and a second edge on opposing ends of the rib; and
when the mounting retainer is secured in the second opening in the second end section of the cage, the first edge of the rib of the mounting retainer abuts the first projection on the second inner surface of the second end section of the cage, and the second edge of the rib of the mounting retainer abuts the second projection on the second inner surface of the second end section of the cage, and prevents the mounting retainer from rotating in the cage.

16. The mounting system for a pullout faucet of claim 11, wherein the rib has a generally semi-circular cross-sectional shape.

17. The mounting system for a pullout faucet of claim 11, wherein:
   the second inner surface of the second end section of the cage includes fastener openings;
   the mounting retainer includes fastener openings; and
   the mounting retainer is secured in the second opening in the second end section of the cage via fasteners that extend through the fastener openings in the mounting retainer and the fastener openings in the second inner surface of the second end section of the cage.

18. The mounting system for a pullout faucet of claim 11, wherein the cage is integrally formed.

19. The mounting system for a pullout faucet of claim 11, wherein the mounting retainer is integrally formed.

20. A pullout faucet with a mounting system, comprising:
   a housing, the housing including a hub and a receptor;
   a wand, the wand including a waterway and an outlet for delivering water from the faucet;
   a handle, the handle operable to control temperature and flow of water being delivered from the faucet;
   a cartridge assembly, the cartridge assembly operable to be connected to the handle, the cartridge assembly operable to control temperature and flow of water being delivered from the faucet based on movement of the handle;
   a cage, the cage operable to be received in the hub of the housing, the cage including a first end section, a second end section, and an intermediate section, the first end section including a first opening, a first outer surface, and a first inner surface, the first opening operable to receive at least a portion of a cartridge assembly, the second end section including a second opening, a second outer surface, and a second inner surface, the second opening operable to receive supply hoses and an outlet hose, the cage including a cavity extending between the first opening and the second opening, the intermediate section extending between the first end section and the second end section, the intermediate section including a third opening, a third outer surface, and a third inner surface, the third opening operable to receive a pullout hose, the second inner surface including a mounting retainer ledge extending around at least a portion of the second inner surface; and
   a mounting retainer, the mounting retainer being separately formed from the cage, the mounting retainer operable to be inserted into the second opening in the second end section of the cage, the mounting retainer including a body and a rib, the body including a first end and a second end, the body including an opening extending through the body from the first end to the second end, the opening in the body operable to receive a mounting shank and the pullout hose, the rib including a first side and a second side, the rib extending around a portion of the body between the first end and the second end;
   wherein, when the mounting retainer is secured in the second opening in the second end section of the cage, the first side of the rib of the mounting retainer abuts the mounting retainer ledge on the second inner surface of the second end section of the cage and prevents the mounting retainer from moving further toward the first end section of the cage.

* * * * *